2,845,429
PRODUCTION OF ACID CHLORIDES

Louis A. Carpino, Amherst, Mass., assignor to Research Corporation, New York, N. Y., a corporation of New York No Drawing. Application August 1, 1956
Serial No. 601,361

6 Claims. (Cl. 260—295)

This invention relates to a novel method for the production of chlorides of carboxylic acids.

I have found that elemental chlorine readily reacts with primary hydrazides of organic carboxylic acids in the presence of hydrogen chloride to form the corresponding acid chlorides. The method is very general and may be applied to the production of chlorides of a wide variety of organic carboxylic acids, such as short and long chain aliphatic mono- and polycarboxylic acids, aromatic mono- and polycarboxylic acids, and heterocyclic carboxylic acids.

The method is preferably carried out by treating a hydrochloride of the hydrazide, in solution or suspension in an anhydrous liquid medium relatively resistant to the action of chlorine at ordinary temperatures, such as nitrohydrocarbons or chlorinated hydrocarbons, with chlorine by passing chlorine gas into the reaction medium or by adding to the liquid medium a solution of chlorine.

The principles of the invention are illustrated by the following examples:

Example I.—Benzoyl chloride

A solution of 13.6 g. of benzhydrazide dissolved in 200 ml. of warm nitromethane was saturated with dry hydrogen chloride gas and then a stream of dry chlorine was passed through the mixture until the white solid has dissolved completely. This required about thirty minutes, after which the nitromethane was removed by distillation from a water bath (75° C.) with the aid of a water aspirator (25 mm.). The yellow liquid (12 g., 85.5%) was distilled through a 30-cm. spiral packed column, B. P. 87–88° C. (25 mm.), $n^{22}D$ 1.5519, yield 10.0 g. (71.1%).

Example II.—Phenylacetyl chloride

A solution of chlorine was prepared by passing chlorine gas into 50 ml. of nitroethane which was cooled in a Dry Ice-acetone bath until 14 g. (0.197 m.) was absorbed. This solution was added all at once to a similarly cooled suspension of phenacethydrazide hydrochloride in 200 ml. of nitroethane prepared from 11.36 g. (0.075 m.) of the hydrazide and dry hydrogen chloride. The mixture was removed from the cooling bath and allowed to stand at room temperature for a few minutes when a vigorous reaction set in and continued for 2–3 minutes. The temperature rose to about 0° C. and was held at this point by means of the cooling bath until the reaction slowed down. The mixture, which still contained a small amount of the insoluble hydrochloride, was cooled to −10° C. and chlorine passed in for 2–3 minutes. A clear greenish-yellow solution resulted upon warming to 0° C. or above and the product was isolated as described in Example I. The yield was 7.61 g. (65.6%), B. P. 98–99 (22 mm.), $n^{24}D$ 1.5317.

Example III.—m-Nitrobenzoyl chloride

This chloride was prepared by the method of Example I except that the crude acid chloride was converted directly to the amide for isolation. The crude amide was obtained in 78.6% yield, M. P. 137–139° C. After one recrystallization from ethanol-water (2:1) the amide had M. P. 139.5–140.5° C. and was obtained in 62.5% yield.

Example IV.—p-Nitrobenzoyl chloride

This acid chloride was prepared by the method of Example II, the product being distilled as before, B. P. 96–97° C. (0.1 mm.), yield 78.9%. A portion of the solidified distillate was recrystallized twice from petroleum ether (B. P. 40–70° C.), M. P. 71–73° C.

Example V.—Succinyl chloride

Since the dihydrazide of succinic acid is insoluble in nitromethane, the dihydrochloride was prepared separately. Chlorine was then passed into a suspension of the hydrochloride in nitromethane. The dichloride, B. P. 90° C. (20 mm.), was characterized as the dianilide, M. P. 232–234° C.

Example VI.—o-Chlorobenzoyl chloride o-Chlorobenzoyl chloride was prepared in 74% yield from o-chlorobenzhydrazide by the method of Example I.

Example VII

Lauric acid hydrazide, M. P. 105–106° C., was converted to lauroyl chloride, B. P. 143–8° C. (12 mm.), yield 66.7%. The method of Example I was used with chloroform as solvent. The anilide melted at 72.5–73.5°.

Example VIII

Isobutyric acid hydrazide, M. P. 102–103° C., was converted to the acid chloride by the method of Example II using methylene dichloride as solvent. The yield was 62.5%, B. P. 90–91° C.

Example IX

Isophthalic acid dihydrazide, M. P. 226–230° C., was treated with HCl—Cl$_2$ according to the method of Example II. The crude acid chloride was added to icecold ammonium hydroxide which gave a 71% yield of the diamide, M. P. 282–284° C.

Example X

The monomethyl ester hydrazide of terephthalic acid, M. P. 204–205.5° C., was converted to the half esteracid chloride by the method of Example I in a yield of 78.6%. The product was isolated as the dimethyl ester, M. P. 141–143° C.

Example XI

The hydrazide of isonicotinic acid was converted to isonicotinoyl chloride by treatment with HCl—Cl$_2$ according to the method of Example I. The product was isolated as the ethyl ester hydrochloride, M. P. 164–166.5° C., yield 70%.

The method of the invention has a number of advantages over the older methods of preparing carboxylic acid chlorides. Since both the active reagent, chlorine, and all of the byproducts are gaseous, the difficulties encountered in separating the product from unused reagents and by-products when using such reagents as phosphorus or sulfur halides is avoided. The reaction is completed in a very short time at room temperatures or below. The method does not lead to cyclization of dibasic acids to the anhydrides as occurs with thionyl chloride, for example.

I claim:
1. The method of making the acid chlorides of organic carboxylic acids which comprises subjecting a primary hydrazide of an organic carboxylic acid in an inert liquid medium to the action of elemental chlorine in the presence of hydrogen chloride.

2. The method of making the acid chlorides of organic carboxylic acids which comprises adding elemental chlorine to a hydrochloride of an organic carboxylic acid primary hydrazide in a chlorine-resistant liquid medium.

3. The method as defined in claim 2 wherein gaseous chlorine is passed into the reaction medium.

4. The method as defined in claim 2 wherein a solution of chlorine in a chlorine-resistant solvent is added to the reaction medium.

5. The method as defined in claim 2 wherein the reaction medium is a nitro-hydrocarbon.

6. The method as defined in claim 2 wherein the reaction medium is a chloro-hydrocarbon.

No references cited.